United States Patent [19]
Jeong et al.

[11] Patent Number: 5,835,176
[45] Date of Patent: Nov. 10, 1998

[54] METHOD FOR PLANARIZING A SUBSTRATE OF A LIQUID CRYSTAL DISPLAY

[75] Inventors: Jae-Gyu Jeong, Daegu; Hong-Man Moon, Taegu; Jeom-Jae Kim, Seoul, all of Rep. of Korea

[73] Assignee: LG Electronics, Inc., Seoul, Rep. of Korea

[21] Appl. No.: 49,348

[22] Filed: Mar. 27, 1998

[30] Foreign Application Priority Data

Jul. 29, 1997 [KR] Rep. of Korea .................. 1997-35753

[51] Int. Cl.⁶ .................................................. G02F 1/1337
[52] U.S. Cl. ............................................. 349/124; 349/158
[58] Field of Search .................................... 349/158, 122, 349/137; 451/41

[56] References Cited

U.S. PATENT DOCUMENTS

| | | | |
|---|---|---|---|
| 4,883,343 | 11/1989 | Teshirogi | 349/137 |
| 5,514,850 | 5/1996 | Miyazaki et al. | 349/158 |

*Primary Examiner*—William L. Sikes
*Assistant Examiner*—James Dudek
*Attorney, Agent, or Firm*—Morgan, Lewis & Bockius LLP

[57] ABSTRACT

A method of planarizing a substrate of a liquid crystal display device includes the steps of depositing a filler material layer over the substrate, wherein an index of refraction of the filler material is similar to an index of refraction of the substrate, and removing a portion of the filler material layer, wherein the filler material layer remains level with a surface of the substrate.

17 Claims, 3 Drawing Sheets

METHOD FOR PLANARIZING A SUBSTRATE OF A LIQUID CRYSTAL DISPLAY

This application claims the benefit of Korean patent application No. 97-35753, filed Jul. 29, 1997, which is hereby incorporated by reference.

BACKGROUND OF THE INVENTION

1. Field of the Invention

The present invention relates to a method for planarizing a substrate of a liquid crystal display, and more particularly, to a method for planarizing a surface on the substrate of the liquid crystal display having grooves or scratches.

2. Discussion of the Related Art

FIGS. 1A–1B illustrate a general structure of a liquid crystal display (LCD), where FIG. 1A is a cross-sectional view and FIG. 1B is a schematic structure of the liquid crystal display.

As shown in FIG. 1A, the liquid crystal display generally has liquid crystals 5 interposed between a thin film transistor plate 10 and a color filter plate 20.

As shown in FIG. 1B, the thin film transistor plate 10 includes a plurality of pixel elements arranged on a first glass substrate 11. Each pixel element has a thin film transistor 12 that functions as a switching device. A pixel electrode 13 is connected to the thin film transistor 12. A plurality of gate bus lines and data bus lines are 25 electrically connected to each of the thin film transistors 12. A protective layer (not shown) and an orientation layer 6 are formed on a surface of the first glass substrate 11.

The color filter plate 20 includes a plurality of color filters 22 formed on a second glass substrate 21. Each of the color filters has one of R, G, B (Red, Green, Blue) pigments, corresponding to respective pixel elements of the thin film transistor plate 10. A light-shielding layer (not shown) is formed where the color filters 22 are absent, that is, corresponding to the data bus lines, gate bus lines, and the thin film transistors 12. A protective layer and an orientation layer 6 are formed on a surface of the color filters 22 and the light shielding layer. Common electrodes 23 are formed on the protective layer and the orientation layer 6, corresponding to the pixel electrodes 13, for applying an electric field to the liquid crystals 5. Polarizing plates 1 and 2 are attached to outer surfaces of the thin film transistor plate 10 and the color filter plate 20.

The operation of the liquid crystal display will now be described.

When a voltage is applied to a particular pixel element of the thin film transistor plate 10, a voltage difference is generated between the pixel electrode 13 and the common electrode 23. As a result, the liquid crystals 5 are reoriented due to an electric field. Light from a rear side of the thin film transistor plate 10 passes through the pixel electrodes 12, the reoriented liquid crystals 5, and the color filters 22, so that a picture is displayed on a screen mounted on an exterior part of the color filter plate 20.

Such a liquid crystal display is manufactured through the steps of forming the thin film transistor plate 10 having the switching devices and the pixel elements, forming the color filter plate 20 having the color filters 22, injecting the liquid crystals 5 between the thin film transistor plate 10 and the color filter plate 20, assembling and sealing the thin film transistor plate 10 and the color filter plate 20, attaching the polarizing plates 1 and 2 to the outer surfaces of the plates 10 and 20, mounting a driving circuit chip on the lower plate, and installing back light sections in the exterior part of the polarizing plates 1. In the manufacture of the thin film transistor plate and the color filter plate as described above, cleaning, deposition, and etching steps may be performed tens times or more. Thus, the glass substrates can be damaged due to mechanical forces, heat, or cold during the manufacturing process.

To prevent the glass substrates from being bent or damaged, thick glass substrates are used initially and are later thinned. In other words, after switching devices or color filters are formed on the thick glass substrates, the glass substrates are combined with each other and reduced in thickness by etching their outer surfaces. Such a method can decrease damage to the glass substrates and failure rate of devices, and can enhance product yield. However, scratches or grooves are formed in the surface of the glass substrate by a physical technique using a polishing agent directly, or by a chemical treatment such as a wet etching with a solution of strong acids. Such an uneven surface of the substrates scatters light, resulting in a difference in transmittances that causes blots (such as black or white spots) on the liquid crystal display.

FIG. 2 illustrates this refraction of incident light on the surface of a glass substrate. As shown in FIG. 2, light passes through the glass substrate G whose surface is imperfect due to scratches and grooves. The light travels in a straight line, but is refracted when passing through an interface between two different media. The extent of refraction, that is, a refractive index, depends on medium material, and thus the refractive index is a property of the medium material. For example, when the light has a wavelength of 589 nm and the refractive index of air is taken to be 1.00, the refractive index of a typical glass substrate is 1.52.

When the light passes from a medium X to another medium Y, the refractive index is given by Snell's law:

$$N_{yx} = \sin\theta_x / \sin\theta_y$$

where $N_{yx}$ is the refractive index of the medium Y with the medium X as a reference, and $\theta_x$ and $\theta_y$ are angles of refraction for the media X and Y. The angle of refraction is the angle from a normal to a surface on which the light is incident.

As seen in FIG. 2, $\sin\theta_1/\sin\theta_2 = \sin\theta_3/\sin\theta_4 = \sin\theta_5/\sin\theta_6 = \sin\theta_7/\sin\theta_8$ (where $\sin\theta_1 = 0$ and $\sin\theta_2 = 0$).

When parallel rays of light 31, 32, 33, 34, 35, 36 reach the substrate, the incident angle and the refractive angle depend on the state of the surface on the substrate. The rays of light 33, 34 and 35, incident upon the grooves or scratches, are refracted and pass through the substrate in unwanted directions. The rays of the light 33, 34 and 35 interfere with rays of the light 31, 32 and 36 that travel along normal paths, and result in a difference in the transmittance of the light.

FIG. 3 illustrates the refraction of light in the liquid crystal display with substrates 10 and 20 having grooves or scratches.

As described above, when a voltage is applied to a certain pixel, light generated from the light source located at the rear of the thin film transistor plate 10 passes through the first polarizing plate 1 and the thin film transistor plate 10, traveling in a single direction into the liquid crystals 5. The light then passes through the color filter plate 20 and the second polarizing plate 2.

Even when light beams incident upon the substrates 10 and 20 are parallel to each other, the incident angle and the refractive angle depend on a state of the surface of the substrates 10 and 20. Therefore the light beams incident upon the grooves or scratches of the uneven surface of the substrate are refracted in the unwanted directions, as shown in FIG. 3. The light beams cause differences in the transmittances and show up as blots on the liquid crystal display.

SUMMARY OF THE INVENTION

Accordingly, the present invention is directed to a method for planarizing a substrate of a liquid crystal display that substantially obviates one or more of the problems due to the limitations and disadvantages of the related art.

One object of the present invention is to create a method for planarizing a substrate of a liquid crystal display in order to reduce spots on the display.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with one aspect of the present invention there is provided a method for planarizing a substrate of a liquid crystal display, including the step of coating a first region or a second region of the substrate with a filler material having a refractive index equivalent to a refractive index of the substrate, wherein the first region is a plane surface and the second region is an uneven plane surface having grooves or scratches.

In another aspect of the present invention there is provided a method of planarizing a substrate of a liquid crystal display device, including the steps of depositing a filler material layer over the substrate, wherein an index of refraction of the filler material is similar to an index of refraction of the substrate, and removing a portion of the filler material layer, wherein the filler material layer remains level with a surface of the substrate.

In another aspect of the present invention there is provided a method of planarizing a substrate of a liquid crystal display device, including the steps of depositing a first filler material layer over the substrate, wherein an index of refraction of the filler material is similar to an index of refraction of substrate, and removing a portion of the first filler material layer to form a second filler material layer over the substrate.

It is to be understood that both the foregoing general description and the following detailed description are exemplary and explanatory, and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1A:
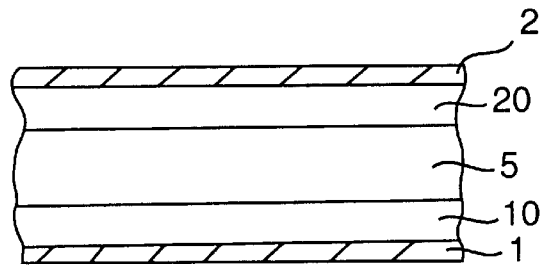
FIGS. 1A–1B illustrate a general structure of a liquid crystal display.
Figure 2:
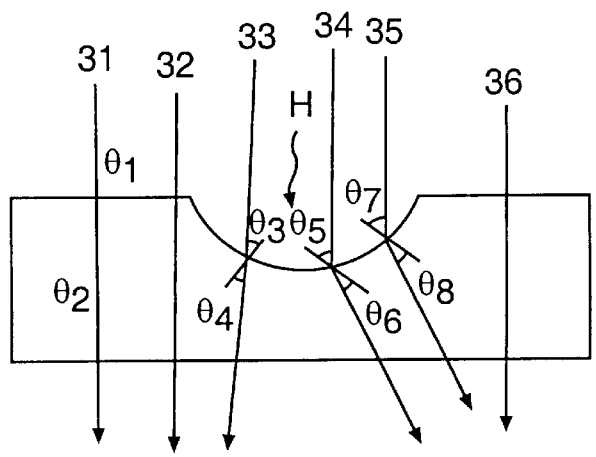
FIG. 2 illustrates refraction of incident light at an uneven surface of a glass substrate.
Figure 3:
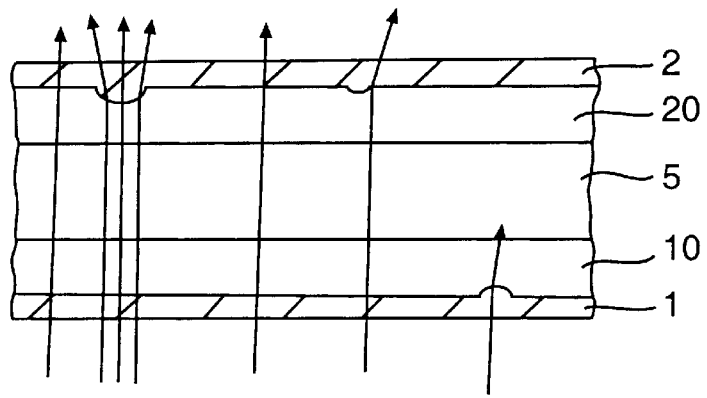
FIG. 3 illustrates the refraction of the incident light in a liquid crystal display having substrate surfaces covered with grooves or scratches.
Figure 1B:
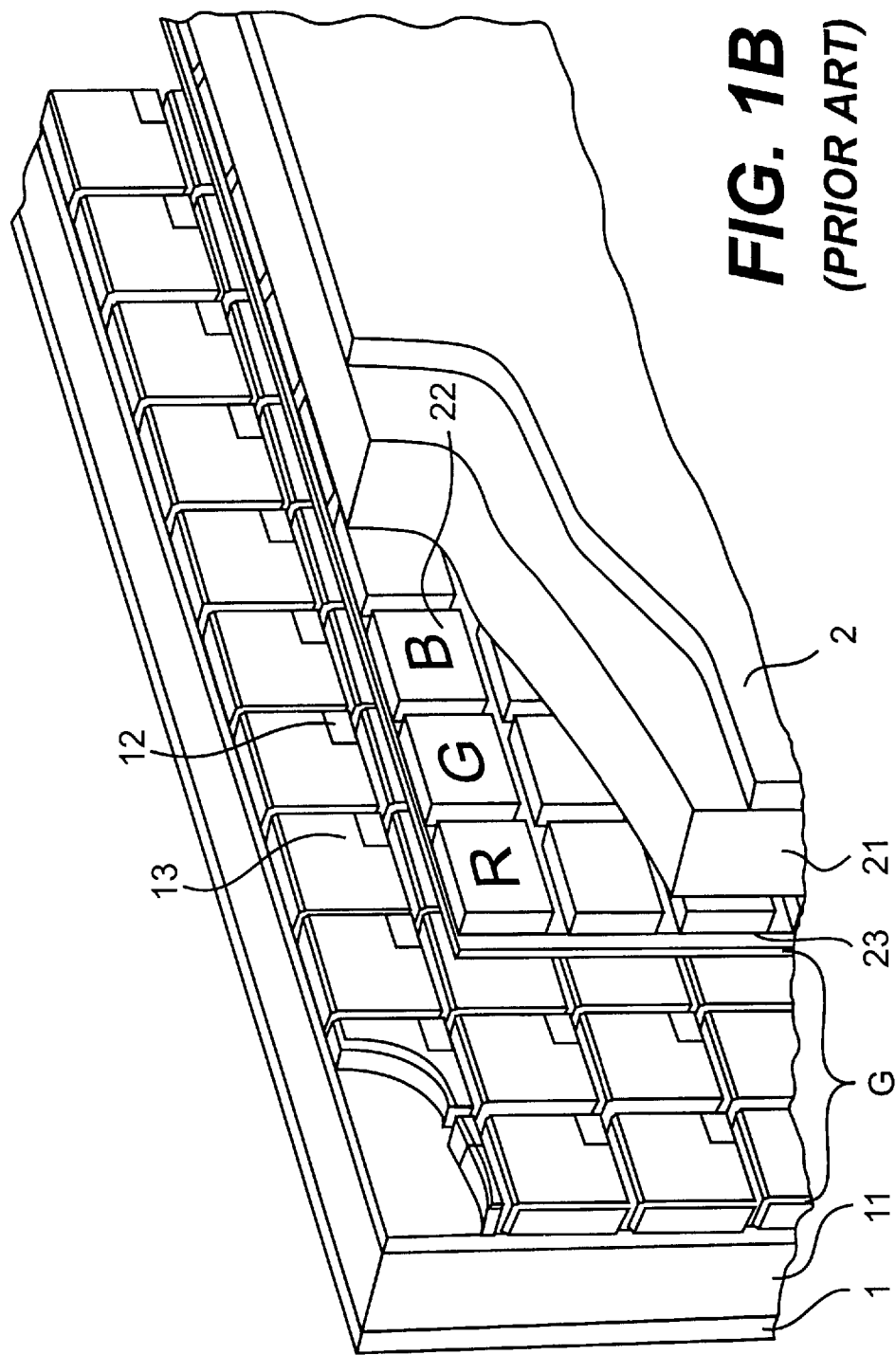
Figure 4:
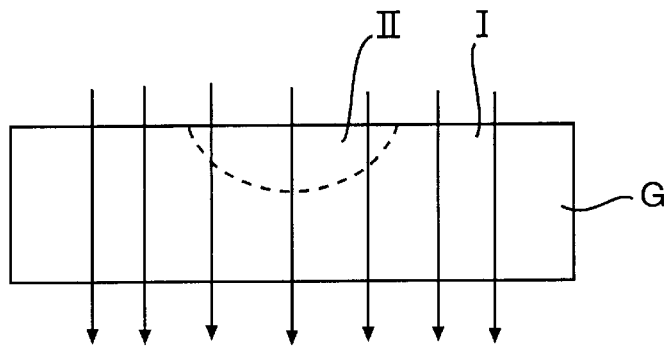
FIG. 4 illustrates the refraction of the incident light upon a substrate whose surface is planarized according to the present invention.

FIG. 4 illustrates refraction at an uneven surface of a glass substrate G that is planarized by filling a groove or scratch on the glass substrate surface with a filler material whose refractive index is equivalent to a refractive index of the glass substrate G.

As shown in FIG. 4, the surface of the glass substrate G is planar because the groove of the glass substrate G is filled with the filler material having the refractive index equivalent to that of the glass substrate G. Original surface of the glass substrate G is referred to as "region I" and a surface planarized by filling a groove with the filler material is referred to as "region II". The filler material preferably has the refractive index equal to that of the glass substrate G and is deposited on an entire surface of the glass substrate G.

Light incident upon the region I is refracted at an angle of refraction due to the refractive index of the glass substrate G. Light incident upon the region II is refracted with the refractive index equivalent to that of region I, and is refracted again at an interface between the region I and the region II. The light passing through the second region II can travel in almost the same direction as light passing through the region I. It is thus possible to prevent a scattering of light caused by the uneven surface of the glass substrate G, based on the fact that the incident angle and the refractive angle are both determined by the state of the surface of the glass substrate G. The refraction of light passing through the glass substrate G can therefore be made uniform by planarizing the surface of the glass substrate G.

Figure 5A:
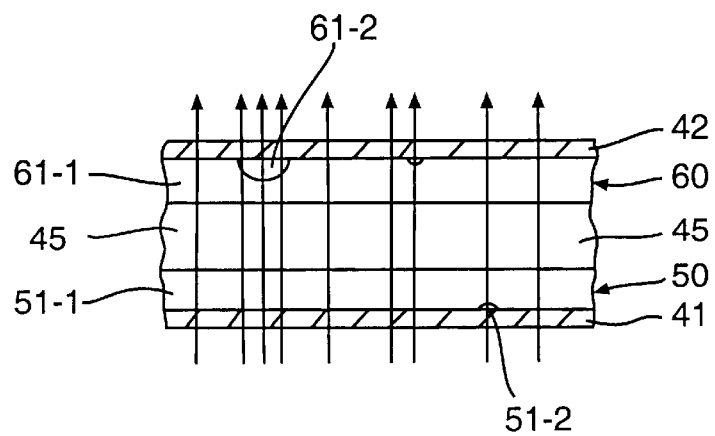
FIGS. 5A–5B illustrate first and second preferred embodiments of the present invention, respectively.
Figure 5B:
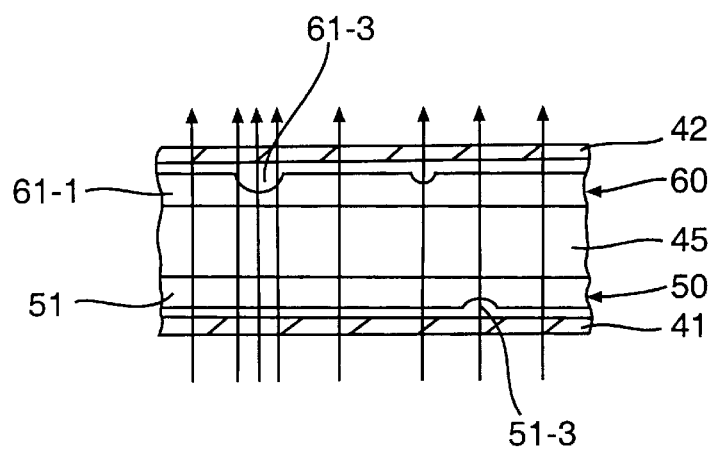

FIGS. 5A–5B illustrate first and second embodiments of a liquid crystal display according to the present invention.

A thin film transistor plate 50 and a color filter plate 60, having glass substrates 51-1 and 61-1, respectively, as a base are assembled having liquid crystals 45 between them. The thin film transistor plate 50 has a plurality of pixels arranged in a matrix, and the color filter plate 60 has a plurality of color filters corresponding to the respective pixels. A light-shielding layer is formed among the color filters, and a protective layer is formed on a surface of the color filters and the light-shielding layer (not shown). Common electrodes are formed on the protective layer for applying an electric field to the liquid crystals 45 of each pixel electrode (not shown). Polarizing plates 41 and 42 are attached to outer surfaces of the thin film transistor plate 50 and the color filter plate 60, respectively.

Each glass substrate 51-1 and 61-1 is planarized by filling the grooves or scratches of their entire surfaces with the filler material having a refractive index similar to that of the substrates 51-1 and 61-1. In the first preferred embodiment of the present invention, the substrates 51-1 and 61-1 are planarized to a level of the circumference surfaces of the substrates 51-1 and 61-1 after filling the grooves or scratches of the surface with the filler material (reference numerals 51-2 and 61-2 in FIG. 5A indicate a portion filled with the filler material). In the second preferred embodiment of the present invention, an entire surface of the substrate is planarized by coating both the grooves or scratches the entire surface of the substrate with the filler material having the refractive index similar to the substrate (reference numerals 51-3 and 61-3 in FIG. 5B indicate filler material layers formed on the surfaces of the substrates 51-1 and 61-1.

When a voltage is applied to a particular pixel on the thin film transistor plate 50, the light from a light source (not shown) located at the rear of the thin film transistor plate 50 passes through the first polarizing plate 41, which passes light polarized in a single direction, and then through the thin film transistor plate 50. The light then passes through the liquid crystals 45, the color filter plate 60, and the second polarizing plate 42.

Since the light incident upon a substrate in a single direction passes through an interface with imperfections removed, all the rays of the light incident upon a media interface in parallel are refracted with the same refractive index. Thus, when passing through thin film transistor plate 50, the liquid crystals 45, and the color filter plate 60, the light from the light source passes through the surfaces of the substrates 51-1 and 61-1 having grooves and scratches filled with the filler material whose refractive index is equivalent to that of the glass substrate, for example, the thin film transistor plate 50 or the color filter plate 60. Thus, the light beams incident upon the surfaces with grooves and scratches are refracted with almost the same refractive index, and pass through the color filter plate. As shown in FIGS. 5A–5B, the rays of light travel parallel to one another. As a result, nearly uniform transmittances can be obtained on the entire surface of the liquid crystal display, preventing blots caused by light scattering.

In the present invention, two substrates are first combined with each other in the cell process, and their thickness is reduced. Liquid crystals are injected between the substrates, following a scribe/break process. The resultant substrates are coated with a filler material that has the refractive index equivalent to that of the glass substrates. The grooves or scratches in the surface of the substrate are filled and the surface is polished with a knife or the like in order to make it planar with the other parts of the glass substrates. The polishing work can be done until the glass substrates are exposed (as shown in a cross-section of the first preferred embodiment), or until only the filler material is planarized in a position to some degree (as shown in a cross-section of the second preferred embodiment).

To omit the polishing work, the filler material can be coated on the entire surface of each substrate to make the entire surface planarized, or it can be coated only in the grooves or scratches so as to planarize the grooves or scratches.

The filler material generally has a refractive index between 1 and 2, including materials such as polyimides, polyamic acids, polyvinyl alcohols, silicon oxides, water glass, or tiling materials.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for planarizing a substrate of a liquid crystal display, comprising the step of:
    coating at least a second region of the substrate with a filler material having a refractive index equivalent to a refractive index of the substrate, wherein a first region is a plane surface and the second region is an uneven plane surface having grooves or scratches.

2. The method of claim 1, wherein the filler material is coated both on the first and second regions, and the whole surface of the substrate is planarized.

3. The method of claim 1, wherein the filler material is coated only on the second region, and the second region is planarized to a level of the first region.

4. The method of claim 1, further including the step of polishing the substrate.

5. The method of claim 1, wherein the filler material is silicon oxide.

6. The method of claim 1, wherein the filler material is water glass.

7. The method of claim 1, wherein the filler material is a tiling material.

8. The method of claim 1, wherein the filler material is a polyimide.

9. The method of claim 1, wherein the filler material is a polyamic acid.

10. The method of claim 1, wherein the filler material is polyvinyl alcohol.

11. The method of claims 1, wherein the refractive index of the filler material is between 1 and 2.

12. A method of planarizing a substrate of a liquid crystal display device, comprising the steps of:
    depositing a filler material layer over the substrate, wherein an index of refraction of the filler material is similar to an index of refraction of the substrate; and
    removing a portion of the filler material layer, wherein the filler material layer remains level with a surface of the substrate.

13. The method of claim 12, further including the step of polishing the filler material.

14. The method of claim 12, wherein the step of depositing the filler material layer includes forming a layer from a material selected from a group consisting of a water oxide, a silicon glass, a tiling material, a polyimide, a polyvinyl alcohol, and a polyamic acid.

15. A method of planarizing a substrate of a liquid crystal display device, comprising the steps of:
    depositing a first filler material layer over the substrate, wherein an index of refraction of the filler material is similar to an index of refraction of the substrate; and
    removing a portion of the first filler material layer to form a second filler material layer over the substrate.

16. The method of claim 15, further including the step of polishing the first filler material layer prior to the step of forming the second filler material layer.

17. The method of claim 15, wherein the step of depositing the first filler material layer includes forming a layer from a material selected from a group consisting of a water oxide, a silicon glass, a tiling material, a polyimide, a polyvinyl alcohol and a polyamic acid.

* * * * *